Oct. 17, 1939.　　　A. J. PENICK ET AL　　　2,176,359
COMBINATION WELL HEAD AND HANGER
Filed Jan. 23, 1937

Inventors
Arthur J. Penick
Kirby T. Penick
Edward W. Hardway
Attorney

Patented Oct. 17, 1939

2,176,359

UNITED STATES PATENT OFFICE 2,176,359

COMBINATION WELL HEAD AND HANGER

Arthur J. Penick and Kirby T. Penick, Houston, Tex.

Application January 23, 1937, Serial No. 121,964

1 Claim. (Cl. 285—22)

This invention relates to a combination well head and hanger and discloses certain improvements over that type of well head and hanger disclosed in our co-pending application, Serial No. 63,848, filed February 14, 1936, now Patent No. 2,144,227 of January 17, 1939.

An object of the invention is to provide, in a well head, a novel type of hanger designed to anchor an inner pipe in the head and to render the corresponding joint of the head fluid tight, said hanger being formed of separable parts connected by threads whereby the parts may be readily connected or released to provide for necessary adjustments of the inner pipe.

Another object of the invention is to provide, in a well head, a tubular hanger for supporting an inner pipe and having an external seal ring for rendering the corresponding joint of the well head fluid tight and a coupling member having a threaded connection with the seal ring and forming a supporting connection for the inner pipe.

It is another object of the invention to provide a two-part hanger, one of said parts forming a seal ring for rendering the corresponding joint of the well head fluid tight and the other part consisting of a coupling for supporting the inner pipe, said parts having a threaded connection whereby the inner pipe may be lowered, adjusted, and raised and the hanger parts thereupon connected to form a permanent hanger for the inner pipe.

With the above and other objects in view the invention has particular relation to certain novel features of construction, arrangement of parts and use, an example of which is given in this specification and illustrated in the accompanying drawing wherein.

Figure 3:
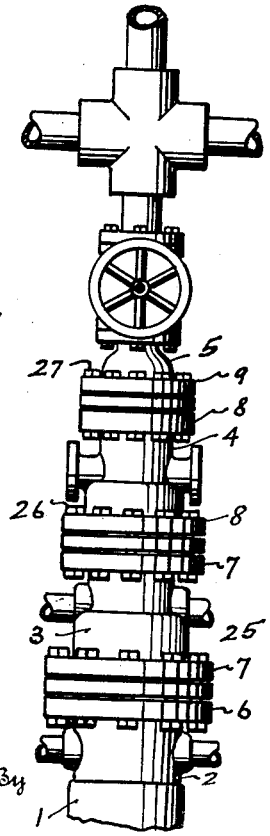
Figure 3 shows a side elevation of the complete hookup.

Referring now more particularly to the drawing, wherein like numerals of reference designate similar parts in each of the figures, the numeral 1 designates the outer, or surface, casing to the upper end of which the casing head 2 is attached. A braden head 3 is mounted on the casing head and a tubing head 4 is mounted on the braden head. On the tubing head is shown a connection 5 for the connection of the usual control valve and Christmas tree as shown in Figure 3.

The heads 2, 3 and 4 have the respective external flanges 6, 7, 7 and 8, 8 as shown and the connection 5 has the external annular flange 9, said flanges having the registering grooves 10, 10, 11, 11 and 12, 12. Each hanger has an external flange 13 forming a seal ring and these flanges have the upper and lower ribs as 14 which seat into the corresponding grooves 10, 11 and 12. Each seal ring is internally threaded as at 15, said threaded portion being extended upwardly forming a sleeve like extension 16.

Threaded through the seal rings are the upper, intermediate and lower hanger couplings 17, 18 and 19. If desired packing as 20 may be fitted around the upper end of each hanger coupling and clamped in place by means of the glands 21 which are screwed into the upper ends of the respective sleeves 16 as shown.

The hanger couplings are internally threaded, at their lower ends, to be screwed onto the upper ends of the corresponding inner pipes 22, 23, 24 respectively whereby the upper ends of said inner pipes may be anchored to the well head.

The registering flanges of the heads 2, 3 and 4 and the connection 5 are anchored securely together by means of the bolts 25, 26, and 27 whereby the ribs 14 are firmly seated in their corresponding grooves to form fluid tight joints.

The hanger may, however, be employed in other combinations than that above specified, and a single hanger, or a plurality of hangers may be used depending on the number of pipes in the well.

In the hookup shown the inner pipes 22, 23 will usually be casings, or water strings, for sealing off water strata encountered in the well while the inner pipe 24 will usually be the tubing or oil string through which the oil flows to the ground surface. The outer pipe or casing is commonly known as the surface casing and forms means for anchoring the head in place.

The upper ends of the hanger couplings 17, 18 and 19 are internally threaded so that a lift nipple may be readily connected thereto for lowering the string of pipe. This lift nipple is merely a section of pipe having its lower end threaded to be screwed into the selected hanger coupling. The internal threads at the upper end of the hanger coupling 17 are preferably left hand threads.

Figure 1:
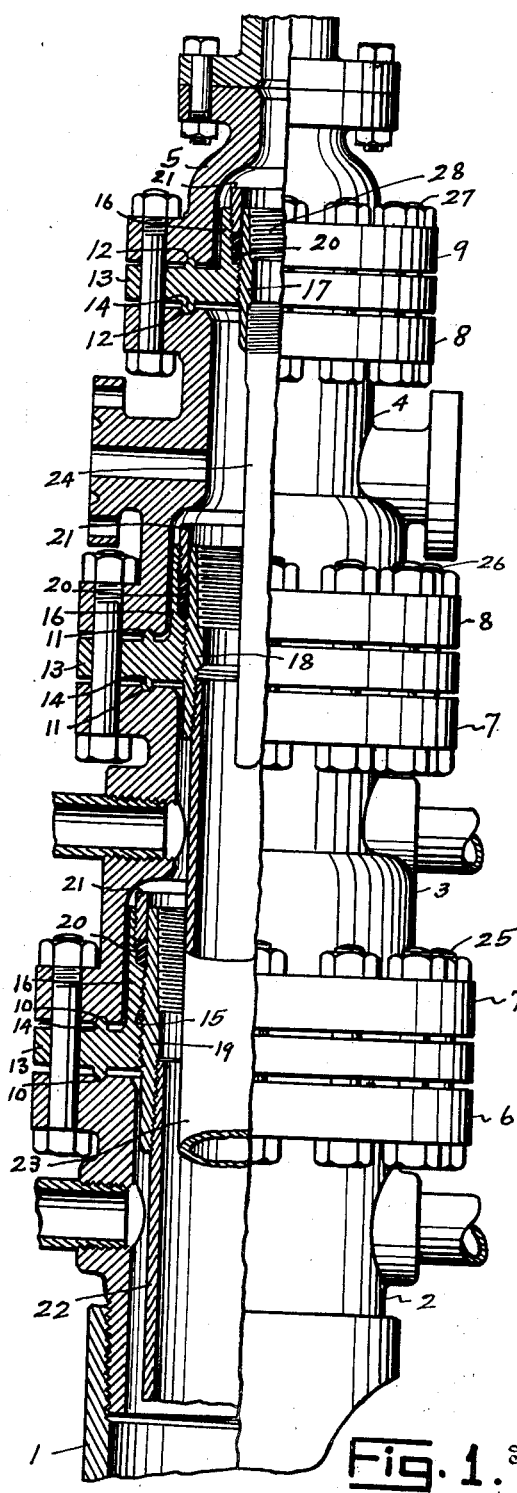
Figure 1 shows a side view of the well head, partly in section, showing the hanger therein.

When the bore is deepened beneath the surface casing and it becomes necessary to case the deepened bore the casing 22, with the hanger coupling 19 attached, will be made up and lowered to bottom. While carrying on this work the braden head 3 and the hook up thereon are not on the casing head 2 and the lower seal ring 13, with its packing are not screwed on to the hanger coupling 19 but are fitted around the lift nipple above. The casing 22 is made up of such length that when it is landed on bottom the hanger coupling 19 will be below its final position. The lower end of the casing 22 is then cemented and anchored firmly in place and an upward pull then exerted on the string 22 by the usual appliance for that purpose to raise the hanger coupling 19 to its final position, the string 22 having sufficient elasticity to permit this. The seal ring 13 is then screwed down on to the coupling 19 until the lower rib 14 is seated in its corresponding groove 16. The braden head 3 is then mounted in position and secured by the bolts 25. When the well is further deepened another string of casing 23 may be lowered and cemented as before and placed under tension to elevate the hanger coupling 18 to its final position and the seal ring 13 may be screwed on to this hanger coupling 18. Upon completion of the well the tubing head 4 may be mounted and secured in place by the bolts 26 as shown in Figures 1 and 3.

When the well is deepened into the producing strata the oil string 24 may be made up and lowered into the well. When the tubing 24 is fully made up the hanger coupling 17 will be connected to the upper end thereof and the lift nipple by means of which the tubing is temporarily suspended will be connected to the hanger coupling 17 by means of left hand threads as 28. The string 24 may be used for washing the well by forcing clean water down through it to displace the heavy drilling fluid with which the well is filled and it may be moved up and down to wash the well screen from top to bottom and then may be elevated and turned to the left to screw the coupling 17 upwardly through the corresponding seal ring 13 which has been previously placed in position on the tubing head 4 and when the hanger coupling 17 has been screwed up into the seal ring 13 it may be packed with the packing 20 as desired and thereafter will be suspended from said seal ring 13. The lift nipple may then be unscrewed by turning it to the right and removed and the gate valve and Christmas tree then installed as shown in Figure 3.

It is to be here noted that each of the heads 2, 3 and 4 are provided with the usual outflow lines beneath their corresponding hangers which may be controlled by conventional control valves in the usual way.

Figure 2:
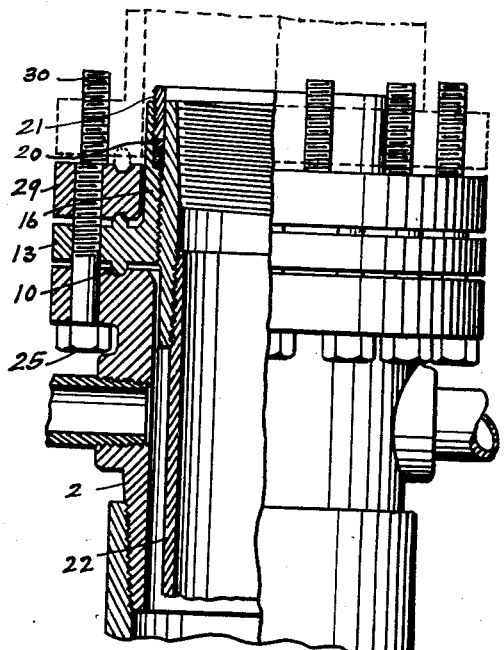
Figure 2 shows a side view, partly in section, of another adaptation of the head and hanger.

The assembly shown in Figure 2 is that used for ordinary drilling purposes and in this assembly there is an annulus 29 into which the upper ends of the bolts 25 are screwed to hold the corresponding seal ring 13 in place. While drilling a conventional type of blowout preventer may be secured on the head by means of the additional upstanding bolts 30 in the manner indicated in dotted lines in Figure 2. When drilling has been completed the blowout preventer may be removed and the installation shown in Figure 1 then completed.

The drawing and description disclose what is now considered to be a preferred form of the invention by way of illustration only while the broad principal of the invention will be defined by the appended claim.

What we claim is:

In combination a tubular head formed of separate parts having registering flanges, a tubular coupling in the head having an external flange threaded thereon and extended into the joint between the flanges of said sections, said coupling being threaded at each end for the attachment of pipe thereto, means for forming fluid tight joints between said section flanges and the flange on the coupling, annular sealing means around the coupling and between it and the flange thereon and means passing through all of said flanges for connecting them immovably together as a unit.

ARTHUR J. PENICK.
KIRBY T. PENICK.